R. C. COX.
GAGE TESTER.
APPLICATION FILED AUG. 28, 1912.
1,218,060.
Patented Mar. 6, 1917.
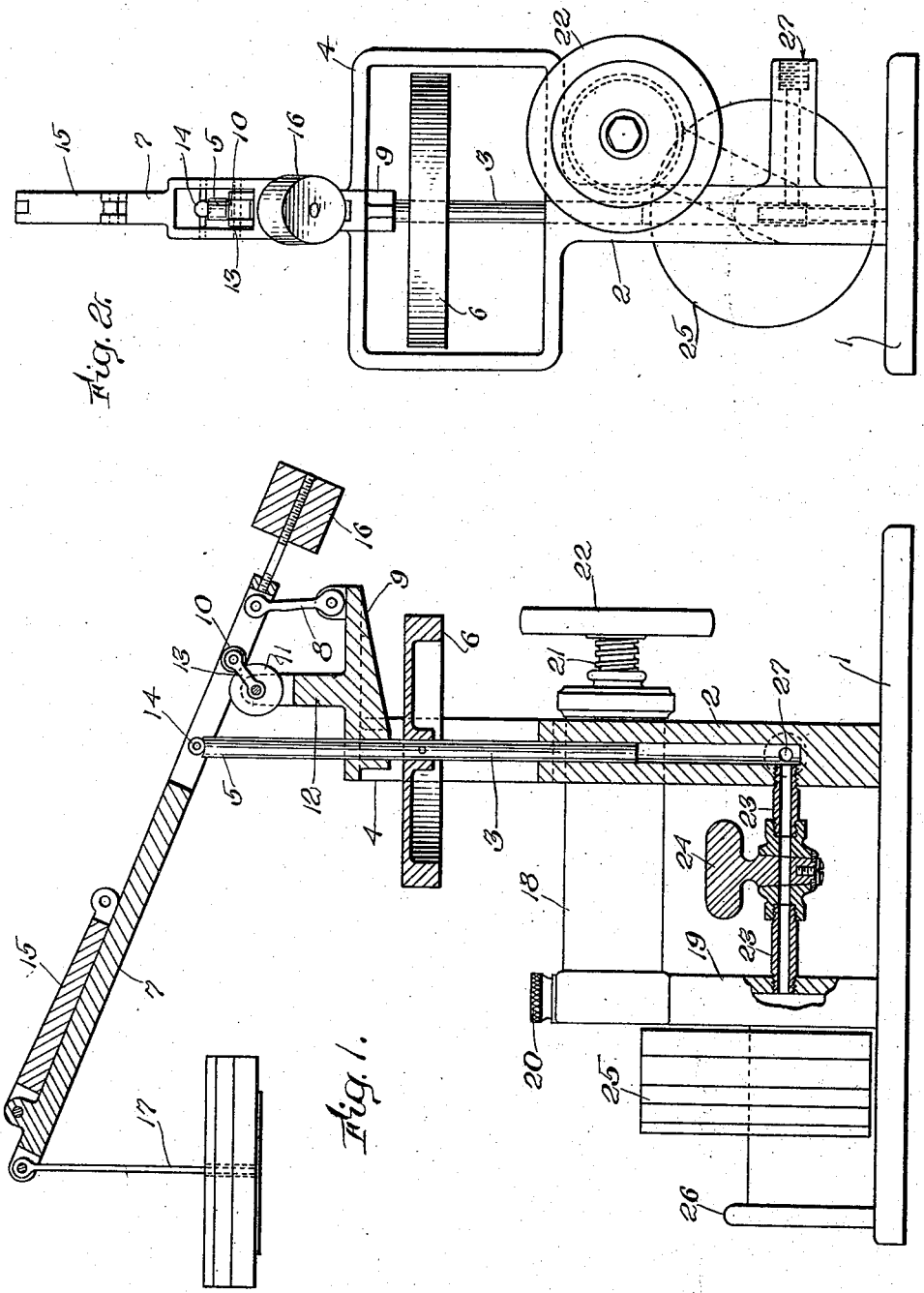

UNITED STATES PATENT OFFICE.

RICHARD C. COX, OF BOSTON, MASSACHUSETTS, ASSIGNOR TO CROSBY STEAM GAGE & VALVE COMPANY, OF BOSTON, MASSACHUSETTS, A CORPORATION.

GAGE-TESTER.

1,218,060.           Specification of Letters Patent.        Patented Mar. 6, 1917.

Application filed August 28, 1912. Serial No. 717,458.

*To all whom it may concern:*

Be it known that I, RICHARD C. COX, a citizen of the United States, and resident of Boston, in the county of Suffolk and State of Massachusetts, have invented certain new and useful Improvements in Gage-Testers, of which the following is a specification.

This invention relates to pressure gage testers and its object is to provide an efficient and durable tester of such compact and simple construction and light weight as to be easily portable.

The invention is illustrated by the accompanying drawings in which—

Figure 1 is a side elevation, partly in section, of the device, and

Fig. 2 is an end elevation looking from the right of Fig. 1.

The machine is mounted on plate 1. The cylinder 2, mounted on plate 1, is furnished with piston 3, which extends upwardly through guiding frame 4, projected from said cylinder 2, and terminates in socket 5; the anti-friction wheel 6 is fixed to said piston 3; the lever 7 is fulcrumed on link 8 pivoted to arm 9 of frame 4; the roller 10, journaled in lever 7, engages roller 11 journaled in support 12 on arm 9, said rollers being held in rolling contact by link 13 connecting their axes; lever 7 is furnished with ball 14 adapted to engage socket 5 of piston 3; said lever is furnished also with the extension 15 foldingly mounted thereon; to the inner end of said lever is adjustably fixed the counter weight 16 and to its outer end the weight tray 17.

The reservoir chamber 18 is mounted in frame 4 and tubular support 19, fixed to plate 1, or cast therewith, and is furnished with the cap 20 and threaded plunger 21 operated by wheel 22; this chamber 18 communicates interiorly with cylinder 2 through tubular support 19 and pipe 23, in which is disposed valve 24; weights 25 are stored on support 26 on plate 1; the pipe 27 leads from cylinder 2 and is adapted to be attached to a pressure gage.

The operation of the machine is as follows:

The operator removes cap 20, closes valve 24, screws plunger 21 into chamber 18 and pours oil, through the opening made by the removal of the cap, into chamber 18, until the system, as far as the closed valve, is filled, the plunger 21 being screwed outwardly as the oil is introduced; the operator then replaces cap 20, opens valve 24, connects pipe 27 with the gage to be tested and screws the plunger inwardly, till the oil under pressure fills the gage and cylinder 2, raising the piston and lever to approximately the position shown in the drawing, in which position anti-friction wheel 6 has not come into contact with frame 4; he then closes valve 24 and, the machine being ready for making tests, places the weights successively upon the tray, thereby, through pressure upon the oil, indicating corresponding pressures upon the gage. While preparing for tests and while tests are being made, the operator rotates anti-friction wheel 6.

The counterweight 16 furnishes means for balancing the lever on its fulcrum (link 8), the lever then preferably being in a horizontal position. The balance being complete, the counterweight may be locked in place by any suitable means, or the lever may be mounted in perfect balance and the counterweight omitted.

When the lever is in a horizontal position, the direction of pressure of ball 14 on socket 5 of piston 3 is wholly vertical, thus avoiding friction between the piston and guiding frame, but in any other position of the lever the direction of such pressure ceases to be wholly vertical and is partly lateral, and it is to avoid such lateral pressure and resulting friction that I employ link 13, which is so arranged as to exert a pull upon the lever adapted to counteract the lateral pressure described.

As the lever is raised or lowered, the outer end of link 13 engaging the axis of roller 10, journaled in the lever, describes an arc of a circle and the inner end of said link is pivoted at the center of such circle. This center may be plotted either mathematically or experimentally.

Rollers 10 and 11 may be omitted and link 13 be pivoted directly to lever 7 and support 12 in any suitable manner. Roller 10 may be journaled in the lever at any convenient point on either side of ball 14, preferably however on the side indicated in the drawing; and the same is true of link 13, should the rollers be omitted.

Link 8, on which the lever is fulcrumed, may be of any convenient length and may be so arranged as to be vertical when the lever is horizontal, or it may have any other angular relation to the lever, so long as it performs its function of enabling ball 14 to travel a vertical path.

The pressure indicated on the gage, when a test is being made, will depend upon the relative lengths of the arms of the lever, the weights used and the diameter of the piston.

Pipe 27 should preferably be of a diameter not greater than that of the piston and of short length.

Extension 15 of the lever enables one to make higher tests with the same weights, or the same tests with lighter weights, thus adding materially to the capacity of the tester without materially increasing its weight, or materially decreasing its weight without impairing its capacity.

The position of the lever, as shown in the drawing, may be called its initial position, while a horizontal may be called its normal position, but the lever is balanced, whatever its position. The machine should preferably be so constructed that, when making the highest test of which it is capable, the lever would occupy a position below the horizontal corresponding to its initial position above the horizontal (shown in the drawing) and the various parts of the machine should be so constructed and so disposed as to permit such range of movement of the lever.

The initial reading on the gage, before any test is made, will indicate the pressure due to the weight of the piston and flywheel attached thereto.

Instead of proceeding in the manner described, it is perfectly obvious that the operator may make his tests in the following manner:

Screw plunger 21 to its outermost position; connect the cylinder with the gage to be tested; open valve 24; apply a weight to the lever, thereby depressing it; fill the system with oil and then screw plunger inwardly till the pressure on the oil raises the weight. In other words, the device would operate as does the ordinary balance. The range of movement in that case could be from a position slightly below the horizontal to the horizontal, or to a position slightly above the horizontal and any suitable means could be employed to exert the power necessary to operate the plunger. Link 13 could then perhaps be omitted, particularly were lever 7 given a very limited range of movement, and valve 24 could also be omitted.

I claim:

1. A pressure gage tester comprising in combination a cylinder; a piston therein; a lever engaging said piston and exerting a vertical pressure thereon; means for maintaining the direction of said pressure; means for connecting the interior of said cylinder with a pressure gage; and counterpoising means for said lever.

2. A pressure gage tester comprising in combination, a cylinder; a piston therein; a lever engaging said piston and fulcrumed on a link pivoted to said cylinder; said link; means for connecting the interior of said cylinder with a pressure gage; and counterpoising means for said lever.

3. A pressure gage tester comprising in combination, a cylinder, a piston therein; a lever engaging said piston and fulcrumed on a link pivoted to said cylinder; said link; a second counteracting link connecting said lever with said cylinder; means for connecting the interior of said cylinder with a pressure gage; and counterpoising means for said lever.

4. A pressure gage tester comprising in combination, a cylinder; a piston therein; a lever engaging said piston and fulcrumed on a link pivoted to said cylinder; said link; means for connecting the interior of said cylinder with a pressure gage; means for rotating said piston; and counterpoising means for said lever.

5. A pressure gage tester comprising in combination, a cylinder; a piston therein; a lever engaging said piston and fulcrumed on a link pivoted to said cylinder; said link; a second counteracting link connecting said lever with said cylinder; means for connecting the interior of said cylinder with a pressure gage; means for rotating said piston; and counterpoising means for said lever.

6. A pressure gage tester comprising in combination, a cylinder; a piston therein; a reservoir chamber communicating with said cylinder; a threaded plunger in said reservoir chamber; a lever engaging said piston and fulcrumed on a link pivoted to said cylinder; said link; means for connecting the interior of said cylinder with a gage; means for operating said plunger; and counterpoising means for said lever.

7. A pressure gage tester comprising in combination, a cylinder; a piston therein; a reservoir chamber communicating with said cylinder by a valve-controlled passage; said valve controlled passage; valve; a threaded plunger in said reservoir chamber; a lever engaging said piston and fulcrumed on a link pivoted to said cylinder; said link; means for connecting the interior of said cylinder with a gage; means for operating said plunger; and counterpoising means for said lever.

8. A pressure gage tester comprising in combination, a cylinder; a piston therein; a reservoir chamber communicating with said cylinder by a valve-controlled passage; valve; a threaded plunger in said reservoir chamber; a lever engaging said piston and fulcrumed on a link pivoted to said cylinder; said link; a second counteracting link connecting said lever with said cylinder; means for connecting the interior of said cylinder with a pressure gage; means for operating said plunger; and counterpoising means for said lever.

9. A pressure gage tester comprising in combination, a cylinder; a piston therein; a lever engaging said piston by a ball and socket joint and fulcrumed on a link pivoted to said cylinder; said link; means for connecting the interior of said cylinder with a pressure gage; and counterpoising means for said lever.

In testimony whereof I have affixed my signature, in presence of two witnesses.

RICHARD C. COX.

Witnesses:
CLARENCE L. NEWTON,
RALPH W. FOSTER.

Copies of this patent may be obtained for five cents each, by addressing the "Commissioner of Patents, Washington, D. C."